Dec. 11, 1951          G. B. BROWN          2,577,737
PARACHUTE PACK
Filed Oct. 23, 1946          2 SHEETS—SHEET 1
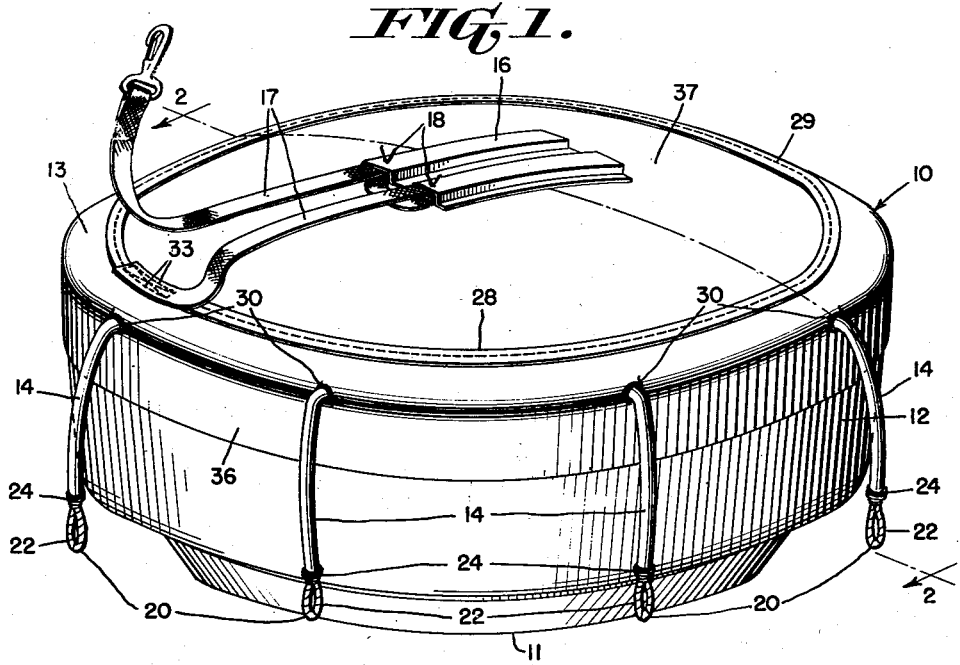
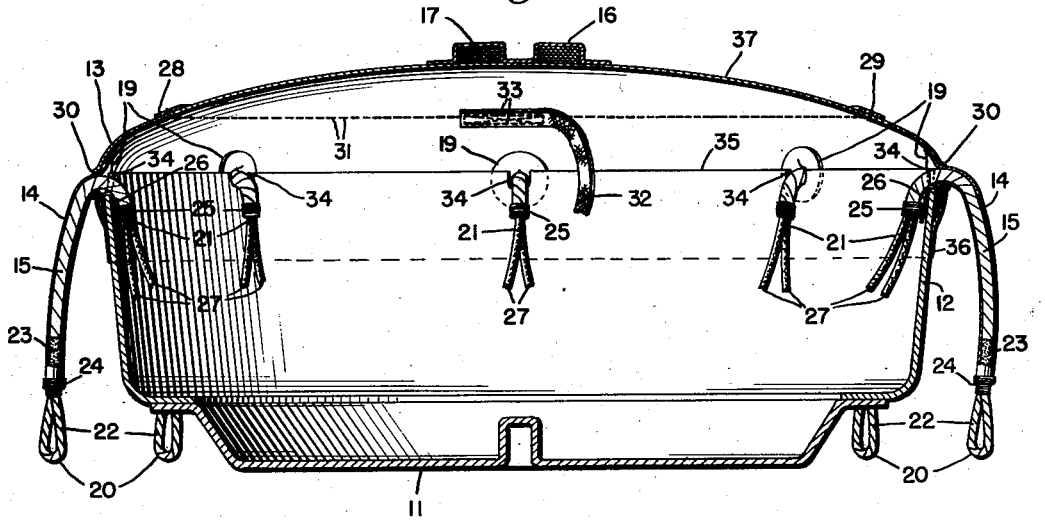
Inventor
*G. B. Brown*
By M. A. Hayes
Attorney Dec. 11, 1951  G. B. BROWN  2,577,737
PARACHUTE PACK
Filed Oct. 23, 1946  2 SHEETS—SHEET 2
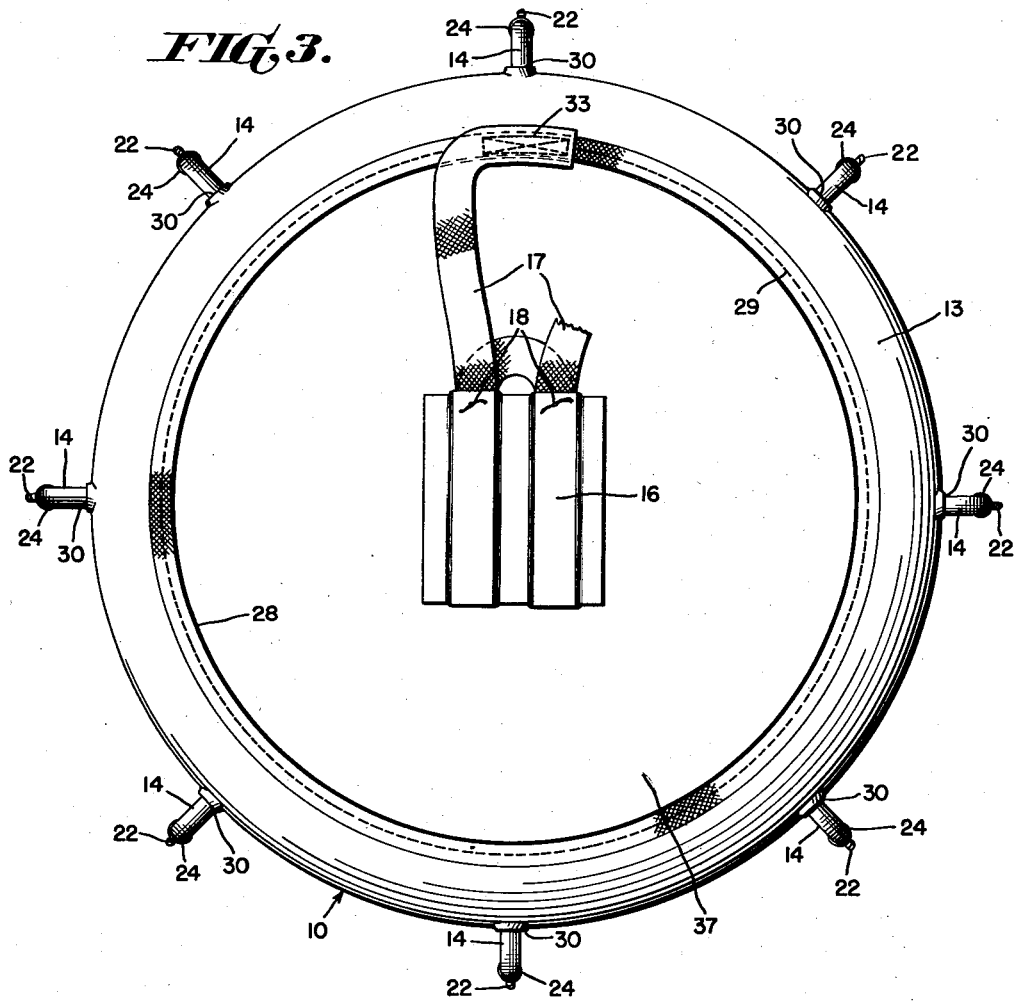
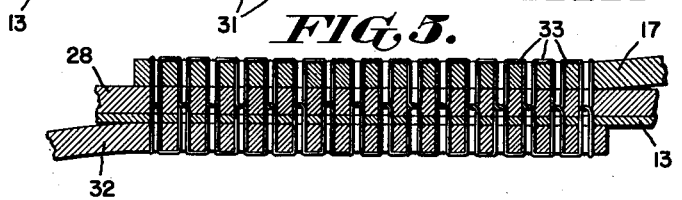
Inventor
*G. B. Brown*
By
Attorney Patented Dec. 11, 1951

2,577,737

UNITED STATES PATENT OFFICE 2,577,737

PARACHUTE PACK

Graham B. Brown, Youngstown, Ohio

Application October 23, 1946, Serial No. 705,120

13 Claims. (Cl. 244—148)

(Granted under the act of March 3, 1883, as amended April 30, 1928; 370 O. G. 757)

This invention relates generally to a pack for parachutes employed for use with objects adapted to be launched from an aircraft in flight and more particularly to improvements in the construction of such a pack whereby the parachutes may be stowed in water-, moisture-, and fungi-proof relation therein and invariably released therefrom as the objects individual thereto fall away from the aircraft.

In certain of the devices of this class heretofore devised such, for example, as the device disclosed in my copending application for Parachute Pack and Release Means Therefor, Serial No. 523,247, filed February 21, 1944, it has been the usual practice to compose the pack of two rigid complementary sections within which the parachute is stowed, the sections being held together releasably by a plurality of straps adapted to be released by means controlled by a static cord secured to the aircraft when the mine has dropped a predetermined distance from the aircraft. Such devices have not been found to be entirely satisfactory under all conditions of service for the reason that the parachutes are stowed within and released from the packs through the same opening therein, and therefore it has not been found possible, with such a construction, to provide a waterproof seal between the aforesaid sections of the pack while also rendering the aforesaid release means effective to pull the sections apart in response to the pull on the static cord.

In accordance with the arrangement of the present invention, the foregoing disadvantages have been obviated by providing a pack composed of a molded plastic material which may be completely sealed at the stowing end thereof after the parachute has been stowed therein to form an integral enclosure therefor which is water-, moisture-, and fungi-proof. The opposite end of the pack is stitched prior to stowing so as to enclose an end portion which may be sheared from the pack by withdrawing the loops of the stitching therefrom, the stitching being formed with a thread attached to the static line and having a tensile strength greater than the shear strength of the material of the end section whereby the end portion is invariably sheared from the pack in response to the force acting on the static line as the parachuted object falls away from an aircraft in flight. A sealing compound is applied to the stitching which effectively seals the same without materially interfering with the shearing action thereof.

Thus, an arrangement is provided in which the parachute is stowed within and released from the pack through different openings therein which makes it possible to seal the releasing end thereof fully prior to the stowing of the parachute within the pack and to thereafter seal the stowing end thereof, thereby to insure the water-, moisture-, and fungi-proof sealing of the pack without introducing the possibility of failure of the pack to open due to faulty assembly thereof as in the prior art devices wherein the parachute is stowed and released from the same opening in the pack.

It is an object of the present invention, therefore, to provide a new and improved parachute pack which will invariably be opened to permit release of the parachute therefrom as the parachuted object falls away from an aircraft in flight.

Another object of the present invention is to provide a new and improved parachute pack which is water-, moisture-, and fungi-proof.

Another of the objects is to provide a new and improved parachute pack which is water-, moisture-, and fungi-proof and which will be opened invariably to permit release of the parachute therefrom as the parachuted object falls away from an aircraft in flight.

A further object is the provision of a new and improved parachute pack in which the parachute is assembled therein through an opening different from that through which it is adapted to be released when a load attached thereto is aerially launched.

A still further object is to provide a new and improved parachute pack which prevents the premature opening thereof to release the parachute by the force of the air currents acting on its static line when the pack is secured to a mine adapted to be carried on the wing racks of an aircraft in flight.

Another object is to provide a parachute pack in the form of an integral closure and having a shearable section through which the parachute may be released.

An additional object is to provide a new and improved parachute pack having a shearable section or portion forming an integral part thereof and a bursting strength which is not decreased by reason of the shearable section.

A further object is to provide a sealed container having a section defined by a row of stitching therein and adapted to be sheared from the container upon withdrawing the loops of the stitching therefrom.

A still further object is to provide a parachute pack of the aforedescribed character which is simple in construction, economical to manufacture, reliable in operation, and which possesses all of the qualities of ruggedness and durability in service.

Additional objects, features, advantages, and improvements will become apparent from the following description of the preferred embodiment of the invention, taken in connection with the accompanying drawings, wherein:

Fig. 1 is a perspective view of a preferred embodiment of the present invention;

Fig. 2 is a sectional view taken along line 2—2 of Fig. 1 showing a riser assembly in detail;

Fig. 3 is a top view of the pack of Fig. 1;

Fig. 4 is an enlarged detailed sectional view illustrating the manner in which the tape is stitched to the top section, and also the manner in which a portion of the top section is sheared therefrom; and Fig. 5 is an enlarged detailed sectional view showing the assembly of the static line, tape, and parachute line with the top section of the parachute pack.

Referring now to the drawings on which like numerals of reference are employed to designate like parts throughout the several views and more particularly to Fig. 1 thereof, there is shown thereon a parachute pack indicated generally by the numeral 10. The pack comprises three sections 11, 12, and 13 made of suitable water-, moisture-, and fungi-proof material, such for example, as any of the well known plastics. The bottom and middle sections, 11 and 12 respectively, are rigidly constructed thereby defining the size and shape of the pack so that it will remain within the desired space limitations of the particular mine or load for which its use is intended. The top section 13 is thinner than sections 11 and 12 and is somewhat more flexible, and is shaped similar to a shallow bowl in order to conform approximately to the shape of the packed parachute which extends beyond the section 12.

Section 13 is provided with a plurality of openings 30 circumferentially arranged thereon in predetermined spaced relation and are adapted to receive respectively a plurality of tubular extensions 14 each enclosing a parachute riser assembly 15. Section 13 further is provided with a pocket 16 for stowing the parachute static line 17, and a means for shearing a circular portion of the section thereby allowing the parachute to be released through the opening thereby produced.

The pocket 16 into which a predetermined length of static line 17 is faked comprises two rectangular shaped sections formed from a single piece made of the same material as the flexible section 13 and is heat-sealed or glued thereto in such a position that the static line 17 will fair out of two sections of the pocket 16 successively when the load to which the pack is attached is launched from an aircraft. A tie string 18 is stitched through each section of the pocket and the static line faked therein and is adapted to hold the folds of the static line in place, the strings 18 being sufficiently weak so that they may be easily broken without injury to the static line when a pulling force is exerted thereon.

The tubular extensions 14 which pass through the circumferentially spaced openings 30 are made of a suitable flexible plastic material such, for example, as Vinylite and are flanged at one end thereof as at 19, the flange being cemented to the inside surface of section 13 such that a strong water-, moisture-, and fungi-proof seal is provided therebetween. The protruding tubular extension covers the portion of the riser assembly 15 which extends to the loop 20 thereof.

The riser assembly 15 comprises a riser cord 21 folded double to form the loop 20 and made of thread of sufficient strength to support the opening load on the parachute stowed in the pack. A flexible plastic tape 22 is wrapped tightly around the looped portion 20 of the riser cord and extends along the length thereof to a point well inside section 13, as shown in Fig. 2. The tape 22 should either be coated with an adhesive before wrapping or else its outside surface should be coated with a lacquer or a solution of the plastic after wrapping so that when this coating hardens the wrapping will be water-, moisture-, and fungi-proof whereby wicking of moisture through the riser assembly and into the pack is prevented.

The riser assembly 15 is fed through the tubular extension 14 towards the flanged end thereof until positioned properly as shown in Fig. 2. Prior to the positioning of assembly 15 within extension 14, the portion 23 of the assembly just above the closure of the loop is coated with an adhesive or a plastic solution so that a waterproof seal will be effected between the assembly and the extension. At the closure of the loop the riser assembly and the extension are served with any suitable type of cord serving 24, and inside the pack the riser assembly is served tightly with similar cord serving 25, the last few turns of the serving passing around a clip 26 which is hooked over the edge of the rigid section 12. The two inside ends 27 of the riser cord are left free until the parachute is packed at which time these ends are attached to the shroud lines of the parachute in a well known manner.

The means for breaking open the parachute pack and releasing the parachute comprises a nylon or a plastic-coated fabric tape or webbing 28 stitched to the flat portion of section 13 as shown in Fig. 3, thereby defining a circular area which forms the shearable portion or section 37 mentioned heretofore. The tape 28 may be eliminated and the means for breaking open the parachute pack may be comprised of the stitching only. Nylon thread 29 is used for the stitching which is a lock stitch, preferably type 301, Federal specification DDD–S–751. More than one line of stitching can be used, when desired, to give an operational safety factor. When the tape 28 is pulled from section 13, the loops of thread 31 on the inside surface of the section are adapted to cut through the section as shown in Fig. 4, for the reason that the loops have a greater tensile stress than the shearing stress of the plastic material of the section, thereby cutting the circular portion 37 away from the section.

The static line 17, tape 28, and parachute line 32 are secured to the section 13 by the stitching 33 as shown in Fig. 5, thus forming a continuous line from the aircraft to the parachute. The static line 17, which pulls the tape 28 from the section is made of a water-, moisture-, and fungi-proof fabric such, for example, as nylon and is of such a length that the aerially launched load will clear the aircraft before the pack is opened and the parachute released. The parachute line 32 stitched to the inside surface of the section 13 is attached to the hem cord of the parachute by means of a frangible cord such, for example, as that disclosed in my copending application for Parachute, Serial No. 492,071, filed June 24, 1943, now Patent No. 2,411,868, issued December 3, 1946, which cord breaks after the parachute has opened, thereby separating the parachute and load from the static line. From the aforedescribed arrangement, it can be seen that a continuous line is obtained from load to aircraft without the necessity of cutting an opening through the section 13 for the parachute line 32, and the force of air currents acting on the static line cannot prematurely open a parachute stored in a pack which is secured to a mine adapted to be carried on the wing racks of an aircraft in flight.

The section 13 is perforated every time the needle goes through for the stitching 29 and 33, thereby destroying the moisture-, water-, and fungi-proofing of the pack. This difficulty is obviated, however, by speading a thin coat of plastic resin or adhesive over the openings on the inside surface of the section 13.

The manner in which the parts of the pack are assembled and in which the parachute is stowed within the pack will now be described. After the tubular extensions 14, riser assemblies 15, static line 17, tie strings 18, and the tape 22 are secured to the section 13, and after the parachute line 32 is stitched to the static line, the tape, and section 13 as shown in Fig. 5, the top section is placed over the outer edge of the middle section 12, as shown in Fig. 2, in such a way that the riser assemblies 15 will drop into the notches 34 provided around the edge 35 of section 12. The clips 26 are hooked over edge 35 in the notches and after serving the riser assemblies inside the pack with the nylon cord serving 25, the last few turns of the serving are passed around the clips, thereby securing the riser assemblies to the clips and preventing any pull on the riser assemblies from reeling out the shroud lines to which the loose ends 27 of the riser cords are attached in the event that the bonds between the riser assemblies 15 and their tubular extensions 14 become broken. The section 13 is then cemented or fused to the section 12 in the area 36 so that a water-, moisture-, and fungi-proof seal will result. The joined sections 12 and 13 form a cavity into which the parachute is adapted to be stored. The parachute is stored into the cavity so that the canopy lies against the inside surface of the flexible section 13. The parachute line 32 is now fastened to the parachute and, thereafter, the shroud lines of the parachute are secured to the free ends 27 of the riser cords by any suitable means such as splicing or by interlocking loops.

Section 11 is placed on section 12 as shown in Fig. 2 and a water-, moisture-, and fungi-proof seal is made by using an adhesive or by fusing. It is to be noted that the plane of the sealed surfaces of sections 11 and 12 does not have to be perpendicular to the vertical axis of the pack, but the two sections may be sealed so that the plane of the two sealed surfaces is parallel to the axis of the pack similar to the sealing of sections 12 and 13.

When the pack is used for parachutes adapted for use with aircraft planted marine mines, the loops 20 of the risers are secured to a release mechanism operable in response to the shock received thereby as the mine strikes the surface of the water to cause an inertia member included therein to operate and disconnect the parachute therefrom. Many other types of release mechanism may be used.

It should now be apparent that a parachute pack has been provided which is well adapted to fulfill the aforesaid objects of the invention and although the invention has been described in particularity with reference to one example thereof which gives satisfactory results, it readily will be apparent to those skilled in the art to which the invention pertains, after understanding the invention, that various changes, modifications, and embodiments may be made without departing from the spirit and scope of the invention, and it is intended, therefore, to cover all such changes in the claims appended hereto.

The invention herein described and claimed may be manufactured and used by or for the Government of the United States of America for governmental purposes without payment of any royalties thereon or therefor.

What is claimed as new and desired to be secured by Letters Patent of the United States is:

1. A parachute pack of the character disclosed comprising a plurality of joined sections adapted to enclose a parachute having a parachute line, means for securing one of said sections to the parachute and to a load adapted to be supported thereby after being dropped from an aircraft in flight, means affixed to another one of said sections and adapted to cut away a portion thereof when a predetermined force is applied to the cutting means thereby providing an opening through which the parachute is released, and a static line of a predetermined length and having one end thereof secured to the aircraft and the other end secured to said cutting means and to the parachute line thereby to provide a continuous line between the aircraft and parachute adapted to exert said force on the cutting means and to pull the parachute from the pack when the load has dropped a predetermined distance from the aircraft.

2. A parachute pack of the character disclosed comprising a plurality of joined sections adapted to enclose a parachute having a parachute line, means for securing one of said sections to the parachute and to a load adapted to be supported thereby after being dropped from an aircraft in flight, a tape, stitching for securing said tape to another one of said sections so as to define a section of predetermined area thereon, said stitching being of a tensile strength greater than the shear strength of the material of which said section is composed whereby said predetermined section is sheared therefrom when a predetermined force is exerted on the tape thereby to provide an opening for release of the parachute from the pack, and a static line of a predetermined length and having one end thereof secured to the aircraft and the other end secured to the tape and to the parachute line thereby to provide a continuous line between the aircraft and parachute adapted to exert said force on the tape and to pull the parachute from the pack when the load has dropped a predetermined distance from the aircraft.

3. A parachute pack of the character disclosed comprising a plurality of joined sections adapted to enclose a parachute having a parachute line, means for securing one of said sections to the parachute and to a load adapted to be supported thereby after being dropped from an aircraft in flight, stitching arranged on one of said sections so as to embrace a predetermined portion thereof, said stitching being of a tensile strength greater than the shear strength of the material of which said section is composed whereby said predetermined portion is sheared therefrom when a predetermined force is exerted on the stitching and an opening is provided through which the parachute may be released, and a static line having one end thereof secured to the aircraft and the other end secured to said stitching and to the parachute line thereby to provide a continuous line between the aircraft and parachute adapted to exert said force on the stitching and to pull the parachute from the pack when the load has dropped a predetermined distance from the aircraft.

4. A parachute pack of the character disclosed comprising a plurality of joined sections adapted to enclose a parachute, a tape circularly arranged on one of said sections, means for securing said tape to said one of said sections so as to shear therefrom that portion embraced by the tape when a predetermined force is applied thereto thereby to provide an opening in the pack for release of the parachute therefrom, and a static line of a predetermined length arranged within a pocket on said one of the sections and having one end thereof adapted to be secured to an aircraft and the other end thereof secured to said tape for applying said force thereto when a load carried by the parachute has dropped a predetermined distance from the aircraft.

5. A parachute pack of the character disclosed comprising means forming an enclosure for a parachute, a tape circularly arranged on said enclosure, stitching for securing the tape to the top section, said stitching being of a tensile strength greater than the shear strength of the material of which said enclosure is composed whereby that portion thereof embraced by the tape is sheared therefrom when a predetermined force is exerted on the tape whereby an opening is provided for releasing the parachute from the enclosure, and a static line having one end thereof adapted to be secured to an aircraft and the other end thereof secured to said tape for exerting said force on the tape when a load carried by the parachute has dropped a predetermined distance from the aircraft.

6. A parachute pack of the character disclosed comprising a plurality of joined sections adapted to enclose a parachute, stitching circularly arranged on one of said sections, said stitching being of a tensile strength greater than the shear strength of the material of which said section is composed whereby that portion thereof embraced by the stitching is sheared therefrom when a predetermined force is exerted on the stitching whereby the parachute may be released through the opening thereby provided, and a static line having one end thereof secured to an aircraft and the other end thereof secured to said stitching for exerting said force on the stitching when a load carried by the parachute has dropped a predetermined distance from the aircraft.

7. In a parachute pack of the character disclosed, the combination of a plurality of sections sealed in a watertight relation and including top and bottom sections adapted to enclose a parachute, a plurality of riser assemblies for connecting the parachute to a load adapted to be supported thereby, said top section having a plurality of openings arranged on the periphery thereof in predetermined spaced relation for receiving said plurality of riser assemblies therethrough respectively, and means for respectively securing said plurality of riser assemblies within said plurality of openings in watertight relation to the top section.

8. A parachute pack of the character disclosed comprising means forming a substantially cylindrical container for enclosing a parachute in watertight relation therein, said container having a plurality of openings arranged on the periphery thereof in predetermined spaced relation, a plurality of riser assemblies passing through said openings respectively, means for securing respectively said plurality of riser assemblies to said container in watertight relation within said plurality of openings therein, and a plurality of means associated with said openings respectively for preventing the riser assemblies from reeling out of the pack.

9. In a parachute pack of the character disclosed comprising a plurality of sections sealed in water tight relation and adapted to enclose a parachute, one of said sections having a plurality of openings arranged on the periphery thereof in predetermined spaced relation, a plurality of riser assemblies passing through said openings respectively and adapted to connect the parachute to a load therefor, a plurality of tubular extensions for respectively securing said riser assemblies to said one of said plurality of sections in watertight relationship within said openings therein, and means including a plurality of clips individual to said plurality of riser assemblies for securing the assemblies to another one of said plurality of sections.

10. A parachute pack of the character disclosed comprising a plurality of sections sealed in a watertight relation and including top and bottom sections adapted to enclose a parachute having a line for pulling the parachute from the pack, said top section having a pocket thereon and a plurality of openings arranged in predetermined spaced relation about the periphery thereof, a plurality of riser assemblies passing through said openings respectively and adapted to connect the parachute to a load therefor, means for securing respectively said plurality of riser assemblies to the top section in watertight relation within said plurality of openings therein, means associated respectively with said plurality of openings for preventing the riser assemblies from reeling out of the pack, means affixed to said top section and adapted to cut away a portion of said one of the sections when a force is applied thereto thereby providing an opening through which the parachute is released, and a static line of a predetermined length arranged within said pocket and having one end thereof adapted to be secured to an aircraft for launching said load and the other end secured to said cutting means and to the parachute line thereby to provide a continuous line between the parachute and aircraft for applying said force to the cutting means and pulling the parachute from the pack when the load has dropped a predetermined distance from the aircraft.

11. A parachute pack of the character disclosed comprising a plurality of sections sealed in watertight and moisture-, and fungi-proof relation and including top and bottom sections adapted to enclose a parachute having a line for pulling the parachute from the pack, said top section having a pocket thereon and a plurality of openings arranged in predetermined spaced relation about the periphery thereof, a plurality of riser assemblies passing through said openings respectively and adapted to connect the parachute to a load therefor, a plurality of tubular extensions for securing respectively said riser assemblies to the top section in watertight and moisture-, and fungi-proof relation within said openings therein, means including a plurality of clips individual to said plurality of riser assemblies for securing the assemblies to one of said plurality of sections, a tape arranged circularly on another one of said plurality of sections, stitching for securing the tape to said another one of said sections, said stitching having a tensile strength greater than the shear strength of the material of which said another one of the sections is composed whereby that portion of the section embraced by the tape is sheared therefrom when a predetermined force is exerted on the tape whereby the parachute may be released through the opening thereby provided, and a static line of a predetermined length arranged within said pocket and having one end thereof adapted to be secured to an aircraft for launching said load and the other end thereof secured to said tape and the parachute line thereby to provide a continuous line adapted to exert said force on the tape and pull the parachute from the pack when the load carried by the parachute has dropped a predetermined distance from the aircraft.

12. In a device of the character disclosed, the combination of a sealed container having a shearable top section, a length of tape arranged in a closed path on one face of the container and defining a central portion to be sheared therefrom, and stitching extending through said top section and said tape for securing the tape to the container, said stitching running the full length of the tape, said stitching and said tape each having a tensile strength greater than the shear strength of the material of which said top section is composed whereby said central portion thereof is sheared from the container by said stitching when the tape is removed therefrom.

13. In a sealed container, the combination of a top section for said container and formed of a material of predetermined tear resistance, a circular line of stitching through said section adjacent the periphery thereof, a tape of greater tear resistance than said predetermined resistance secured to said top section by said stitching to define a shearable central portion of said section and extending the full length thereof, said stitching having greater break resistance than said predetermined tear resistance whereby said central portion is sheared by said stitching in response to a pull on the tape.

GRAHAM B. BROWN.

REFERENCES CITED

The following references are of record in the file of this patent:

UNITED STATES PATENTS

| Number | Name | Date |
|---|---|---|
| 2,019,254 | Dossena | Oct. 29, 1935 |
| 2,392,479 | Humbert | Jan. 8, 1946 |

FOREIGN PATENTS

| Number | Country | Date |
|---|---|---|
| 426,586 | Great Britain | Apr. 5, 1935 |